(12) United States Patent
Lin

(10) Patent No.: US 10,024,185 B2
(45) Date of Patent: Jul. 17, 2018

(54) BRAZE GEL, BRAZING PROCESS, AND BRAZING ARTICLE

(71) Applicant: GENERAL ELECTRIC COMPANY, Schenectady, NY (US)

(72) Inventor: Dechao Lin, Greer, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/271,960

(22) Filed: Sep. 21, 2016

(65) Prior Publication Data
US 2018/0080336 A1    Mar. 22, 2018

(51) Int. Cl.
*B23K 1/00*    (2006.01)
*F01D 11/02*    (2006.01)
(Continued)

(52) U.S. Cl.
CPC ............ *F01D 11/02* (2013.01); *B23K 1/0014* (2013.01); *B23K 1/0018* (2013.01); *B23K 35/025* (2013.01); *B23K 35/0222* (2013.01); *B23K 35/0244* (2013.01); *B23K 35/286* (2013.01); *B23K 35/302* (2013.01); *B23K 35/3006* (2013.01); *B23K 35/3013* (2013.01); *B23K 35/3033* (2013.01); *B23K 35/3046* (2013.01); *B23K 35/36* (2013.01); *B23K 35/3603* (2013.01); *B23K 35/365* (2013.01); *B23K 35/3605* (2013.01); *B23K 35/3613* (2013.01); *F01D 11/003* (2013.01);
(Continued)

(58) Field of Classification Search
CPC .. B23K 35/36; B23K 35/3612; B23K 1/0012; B23K 1/008; B23K 1/206

USPC .... 148/24, 23; 228/223, 248.1, 253, 262.42, 228/56.3
See application file for complete search history.

(56) References Cited

U.S. PATENT DOCUMENTS 3,001,274 A * 9/1961 Price .................. B23K 1/0014
                                                228/181
3,023,127 A * 2/1962 Clayton ................ C23C 24/045
                                                427/242

(Continued)

FOREIGN PATENT DOCUMENTS

CN         101100601 A    1/2008

OTHER PUBLICATIONS

Extended European Search Report and Opinion issued in connection with corresponding EP Application No. 17192116.6 dated Jan. 31, 2018.

*Primary Examiner* — Erin Barry Saad
(74) *Attorney, Agent, or Firm* — McNees Wallace & Nurick LLC

(57) ABSTRACT

A braze gel includes a braze powder, a braze binder, and a viscosity reducer. The braze gel has a gel viscosity sufficiently low to permit dip coating of a component with the braze gel to apply a braze coating of the braze gel to the component. A brazing process includes applying the braze gel to a portion of a component. The brazing process also includes drying the braze gel to form a braze coating on the component to form a braze-coated component. A brazing article includes a component and a braze coating over a portion of the component. The component may have structural features having a spacing of less than about 5 mm and a depth of at least about 1 mm, which may be honeycomb cells. The component may be a turbine component.

20 Claims, 4 Drawing Sheets

(51) Int. Cl.
*B23K 35/02* (2006.01)
*B23K 35/36* (2006.01)
*B23K 35/30* (2006.01)
*B23K 35/28* (2006.01)
*F01D 11/00* (2006.01)
*B23K 35/365* (2006.01)

(52) U.S. Cl.
CPC ........ *F01D 11/005* (2013.01); *F05D 2220/32* (2013.01); *F05D 2230/237* (2013.01); *F05D 2250/283* (2013.01)

(56) References Cited

U.S. PATENT DOCUMENTS

| | | | |
|---|---|---|---|
| 3,073,270 A * | 1/1963 | Johnson | B23K 35/3612 |
| | | | 148/24 |
| 3,166,402 A * | 1/1965 | Berson | B23K 35/3612 |
| | | | 148/22 |
| 3,527,625 A * | 9/1970 | Mollring | B23K 35/3615 |
| | | | 148/24 |
| 4,151,016 A | 4/1979 | Lee | |
| 4,431,465 A | 2/1984 | Mizuhara et al. | |
| 5,120,374 A | 6/1992 | Mizuhara | |
| 5,443,658 A | 8/1995 | Hermanek | |
| 6,367,686 B1 | 4/2002 | Abriles et al. | |
| 2008/0053645 A1 | 3/2008 | Hakamata et al. | |
| 2008/0127494 A1* | 6/2008 | Rassmus | B23K 1/0012 |
| | | | 29/890.054 |
| 2009/0214773 A1 | 8/2009 | Moran et al. | |
| 2013/0064602 A1 | 3/2013 | Chaumat et al. | |
| 2013/0175325 A1* | 7/2013 | Lin | C23C 10/48 |
| | | | 228/124.1 |
| 2015/0027679 A1 | 1/2015 | Singh et al. | |

* cited by examiner

BRAZE GEL, BRAZING PROCESS, AND BRAZING ARTICLE

FIELD OF THE INVENTION

The present embodiments are directed to braze compositions, brazing processes, and brazing articles. More particularly, the present embodiments are directed to a braze composition including a viscosity reducer, a brazing article, and a process of forming a brazed article with the braze composition.

BACKGROUND OF THE INVENTION

Certain gas turbine components, such as, for example, shaft-type labyrinth seals and rotating blade shroud seals, are often constructed from honeycomb structures of thin foils of high-temperature metal alloys. The honeycomb structure provides a high structural strength combined with a low weight. The honeycomb structure also simultaneously provides an excellent sacrificial wear surface and an excellent gas flow seal. The spacing of the honeycomb cell is typically in the range of about 0.8 mm to about 3 mm (about 0.031 in. to about 0.125 in.) across. The depth of the honeycomb cell is typically in the range of about 1.5 mm to about 21.6 mm (about 0.062 in. to about 0.85 in.) but may be less than or greater than this range depending on the application.

The honeycomb structure in a turbine seal allows for the expansion of turbine materials during turbine operation with increasing temperature and centrifugal force. The honeycomb structure is often brazed to a backing structure. The brazing joins the metal foils of the honeycombs to the metal of the backing structure. A sacrificial layer of a honeycomb structure of a relatively soft material brazed into a wide slot built into the turbine wall along the blade path allows the blades to grow. The harder blade tips cut a path into the softer honeycomb shroud seal, which preserves the integrity of the blades and the turbine wall.

In order to achieve the desired wear surface, the honeycomb material must be softer than the blade material. As the braze material tends to be harder than the honeycomb material after brazing, it is important to minimize the amount of braze material at the wear surface of the honeycomb to avoid wear on the blade. It is difficult, however, to apply the braze material to the base of the honeycomb for brazing to the backing structure due to the structure of the honeycomb.

Braze tape, braze powder, and braze paste can each be used for brazing a honeycomb structure to a backing structure, but each has its disadvantages. Although braze tape applies an even, minimal amount to the metal foils at the base of the honeycomb, the braze tape spans the empty space between metal foils where braze composition is not needed or desirable, and is therefore a waste of braze material. Braze tape is also expensive and must be handled carefully to prevent detachment prior to brazing. Braze powder can be added to the honeycomb cells by peppering by hand or by an automated chute, but a layer of powder that also covers the entire empty space of each honeycomb cell must be applied, and a cement must then be sprayed over the braze powder to hold it in place prior to brazing. Finally, the viscosity of a braze paste makes it difficult to provide a small, consistent amount of braze paste to the base of the honeycomb, and a braze paste may adversely affect the tack weld quality.

BRIEF DESCRIPTION OF THE INVENTION

In an exemplary embodiment, a braze gel includes a braze powder, a braze binder, and a viscosity reducer. The braze gel has a gel viscosity sufficiently low to permit dip coating of a component with the braze gel to apply a coating of the braze gel to the component.

In another exemplary embodiment, a brazing process includes applying a braze gel including a braze powder, a braze binder, and a viscosity reducer to a portion of a component. The brazing process also includes drying the braze gel to form a braze coating on the component to form a braze-coated component. The braze gel has a gel viscosity sufficiently low to permit dip coating of a component with the braze gel to apply a coating of the braze gel to the component.

In another exemplary embodiment, a brazing article includes a component and a braze coating over a portion of the component. The braze coating is formed by drying a brazing gel. The braze gel includes a braze powder, a braze binder, and a viscosity reducer. The braze gel has a gel viscosity sufficiently low to permit dip coating of a component with the braze gel to apply the braze gel to the component.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary braze gels, brazing processes, and brazing articles. Embodiments of the present disclosure, in comparison to compositions, processes, and articles not using one or more of the features described herein, provide a braze gel having a lower viscosity than conventional braze pastes, replace braze tape for honeycomb brazing, provide honeycomb brazing without using braze tape, provide an inexpensive braze coating, provide a braze coating to a component having small structural features, provide a braze gel that sticks to a component surface better than a conventional braze paste, or a combination thereof.

Figure 1:
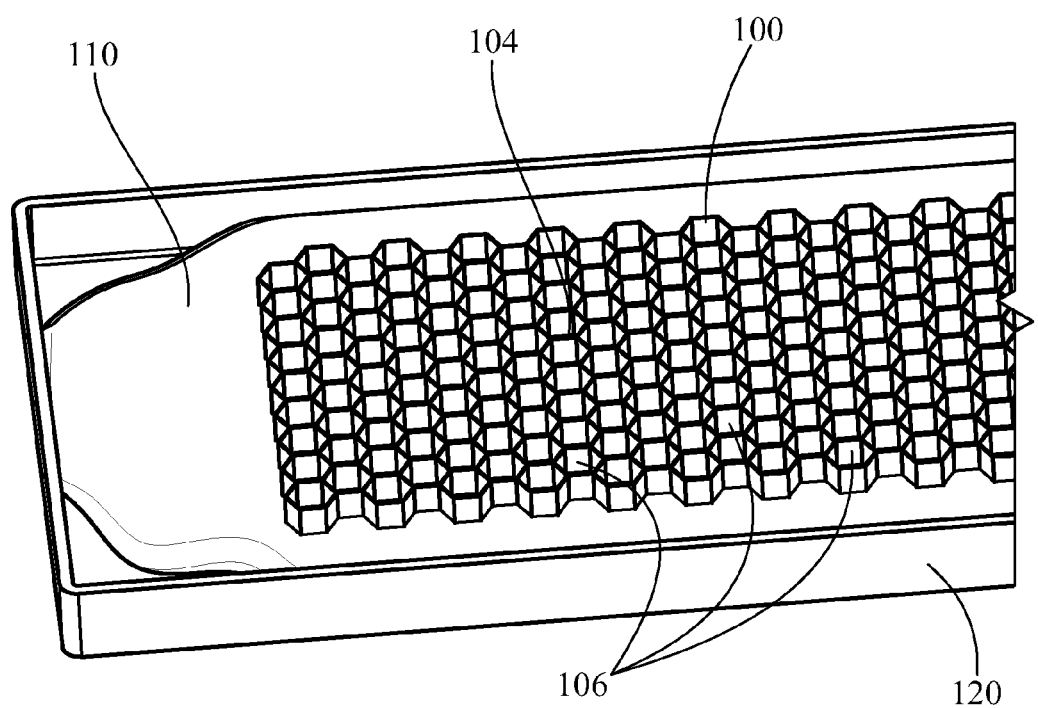
FIG. 1 is a perspective view of a portion of a component contacting a braze gel in an embodiment of the present disclosure.

Referring to FIG. 1, a brazing process includes contacting a first end 102 (see FIG. 2) of a component 100 to a braze gel 110 to coat a portion of the component 100, including the first end 102, with the braze gel 110. FIG. 1 shows a dip coating method, where the braze gel 110 is held in a container 120, but other contacting methods may be employed, including, but not limited to, spray coating or brush coating. The component 100 includes structural features 106 in the form of honeycomb cells. The braze gel 110 coats the first end 102 of the component 100, but the braze gel 110 does not contact the second end 104 of the component 100. After the braze gel 110 is applied to the first end 102 of the component 100, the component 100 is removed from the container 120 and the braze gel 110 is allowed to dry on the coated surface of the component 100. In some embodiments, the component 100 is turned upside-down such that the braze gel 110 is on the upper portion of the component 100 during drying. In some embodiments, the component 100 is held with the coated surface being the lower portion of the component 100 during drying. The drying may occur under ambient temperature and air conditions, or heating, air flow, and/or a vacuum may be used to decrease the drying time.

Figure 2:
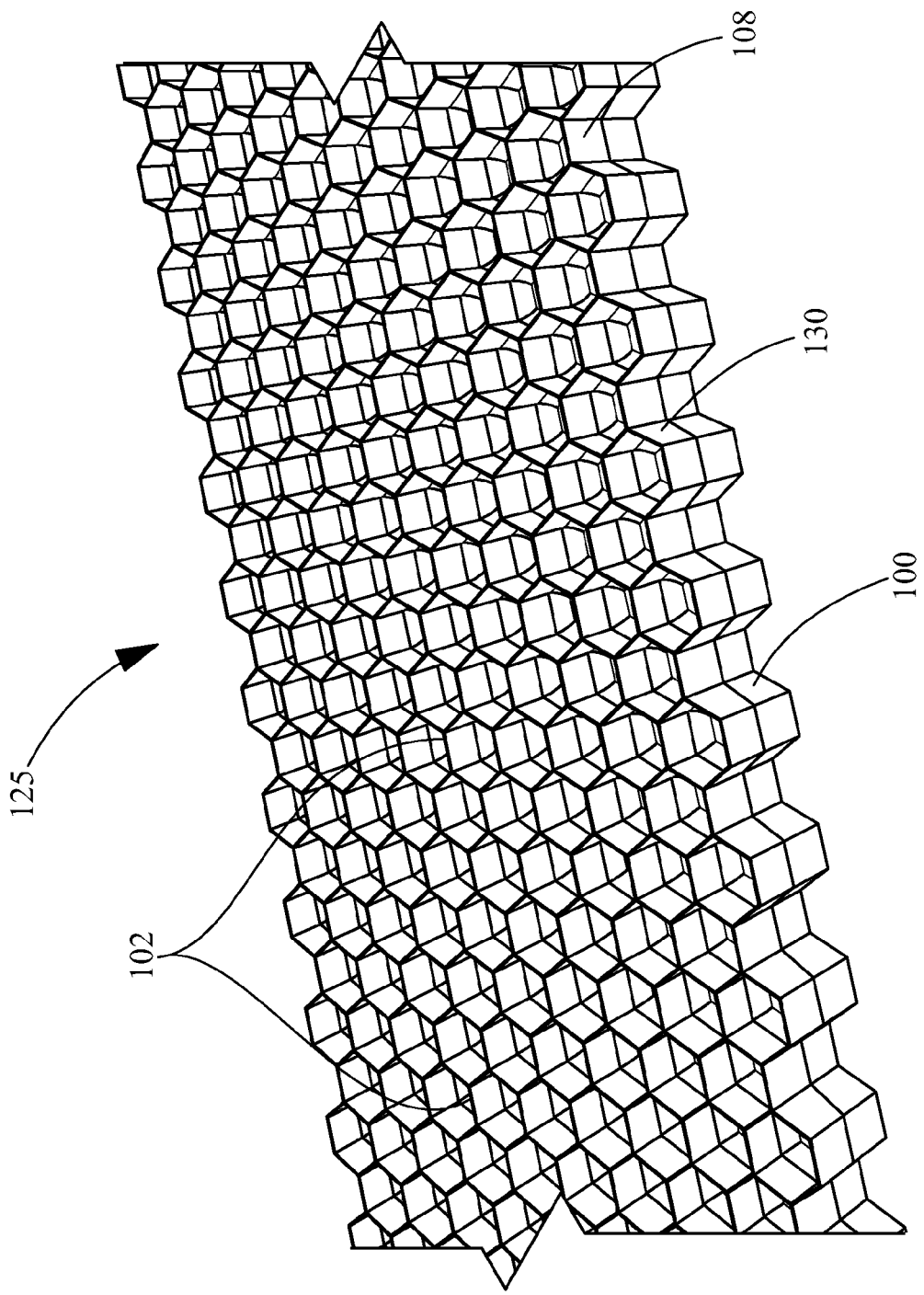
FIG. 2 is a perspective view of a brazing article, including the component of FIG. 1 partially coated with a dried braze coating.

FIG. 2 shows a brazing article 125, which includes the component 100 and a braze coating 130 dried on the coated portion 108, including the first end 102 of the component 100. The first end 102 of the component 100, which is the upper end as shown in FIG. 2, is ready to be brazed to a backing member 140 (see FIG. 3). The brazing article 125 is flipped over, with the first end 102 facing the backing member 140, and the component 100 is then brazed to the backing member 140.

Figure 3:
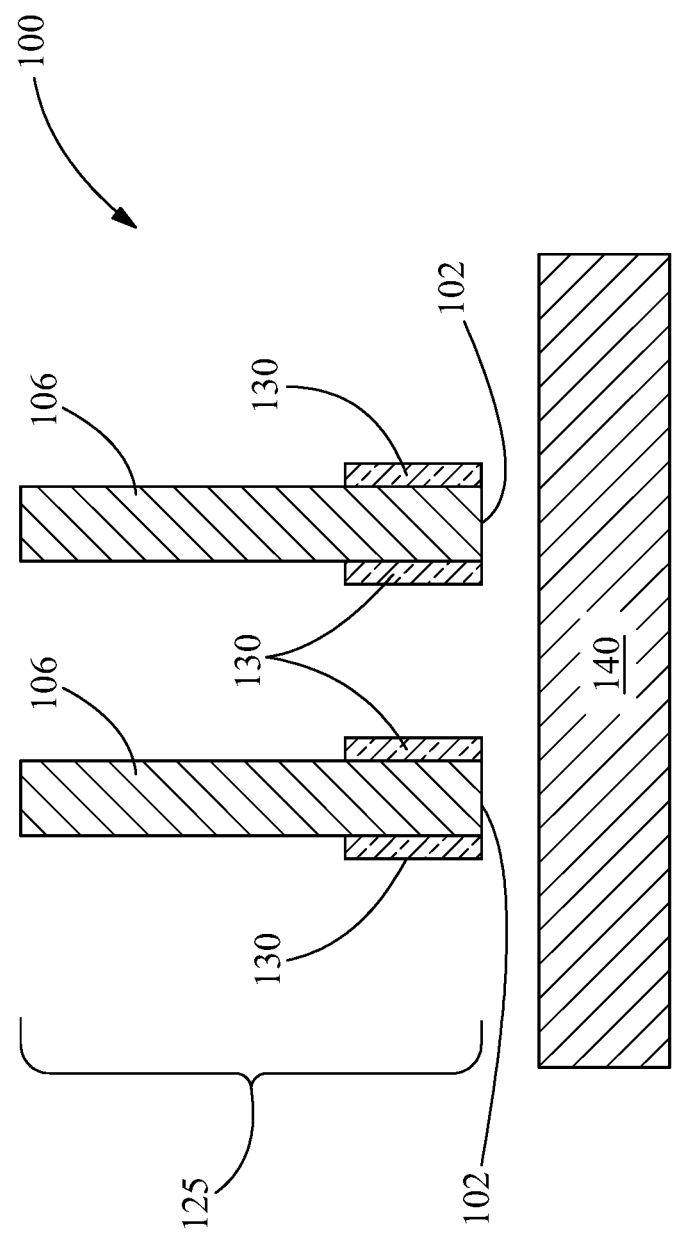
FIG. 3 is a schematic cross sectional view of the brazing article of FIG. 2 and a backing member ready to be brazed together.

In FIG. 3, any braze coating 130 on the first end 102 of the structural features 106 of the component 100 has been mostly or substantially removed to permit direct contact between the structural features 106 and the backing member 140 prior to brazing. As shown in FIG. 3, the braze coating 130 forms only a thin layer over the structural features 106. The thickness of the braze coating 130 is preferably selected to provide enough material to form a good braze between the component 100 and the backing member 140 while providing no more than a predetermined excess amount of braze material to limit waste. The braze coating 130 does not span the space between the structural features 106. Tack welding may be used to temporarily attach the component 100 to the backing member 140 prior to brazing.

Brazing is then performed by heating the braze coating 130 to a braze temperature to melt the braze coating 130. In some embodiments, the assembly of the brazing article 125 and the backing member 140 placed in a furnace to heat the braze coating 130 to the braze temperature. At least a portion of the melted braze material from the braze coating 130 flows between the first end 102 of the structural features 106 and the backing member 140 to braze the component 100 to the backing member 140.

Figure 4:
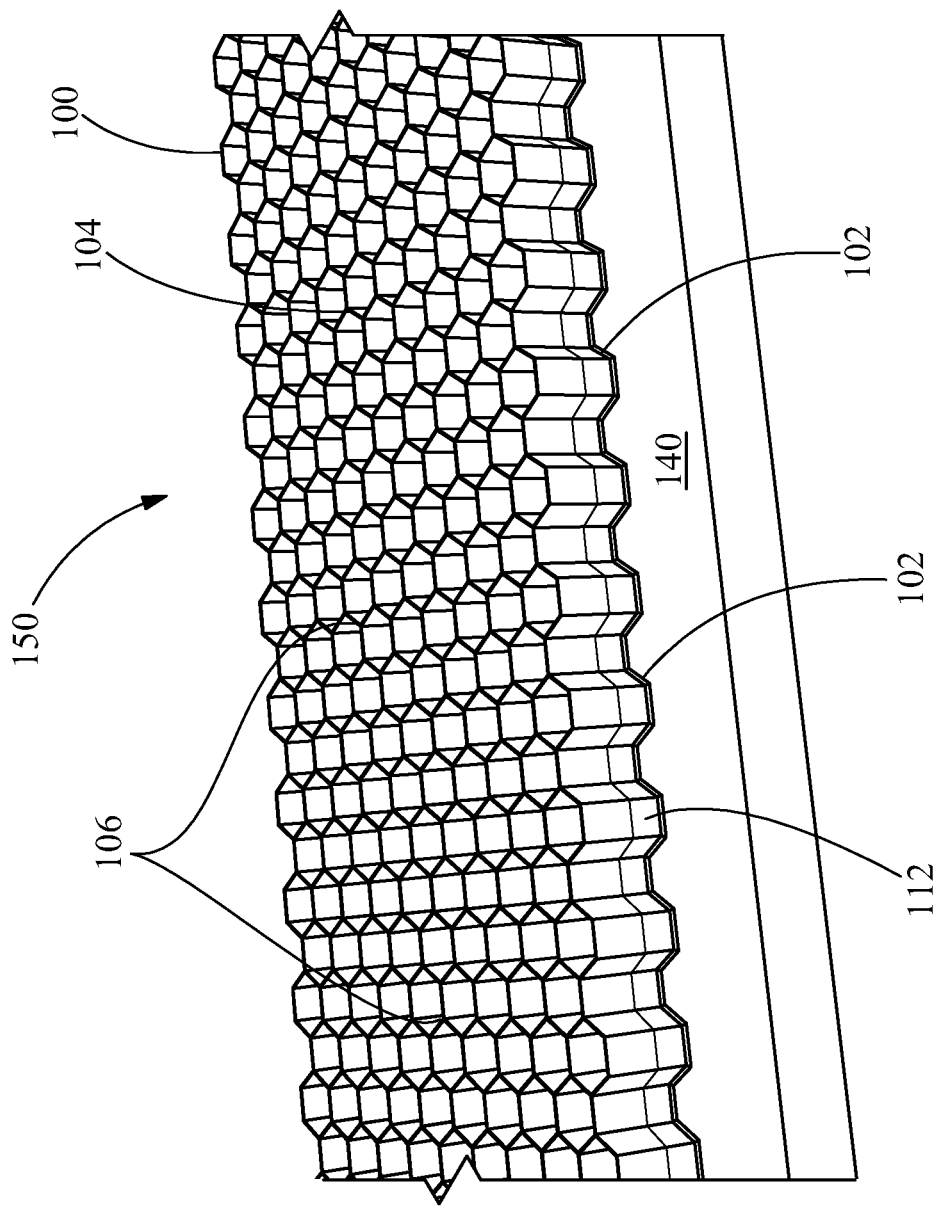
FIG. 4 is a perspective view of a brazed article including the brazing article and backing member of FIG. 3.

FIG. 4 shows a brazed article 150 including the component 100 brazed to the backing member 140. The component 100 is brazed well to the backing member 140 with an even brazing and without having any braze material 112 at or near the second end 104 opposite the coated portion 108 of the component 100. A thin layer of braze material 112 may remain on the lower portion of the sidewalls of the structural features 106 of the component 100 after brazing.

A braze gel 110 includes at least one braze powder, at least one braze binder, and at least one viscosity reducer. In some embodiments, the braze gel 110 has a gel viscosity less than a paste viscosity of a braze paste including the braze powder and the braze binder with no viscosity reducer. In some embodiments, the braze gel 110 has a gel viscosity sufficiently low to permit dip coating of a component 100 to apply a coating of the braze gel 110 to the component 100. In some embodiments, the braze gel 110 has a gel viscosity sufficiently low to permit spray coating of a component 100 to apply a coating of the braze gel 110 to the component 100. In some embodiments, the braze gel 110 has a gel viscosity sufficiently low to permit brush coating of a component 100 to apply a coating of the braze gel 110 to the component 100. In some embodiments, the braze gel 110 has a gel-like consistency. The viscosity reducer is preferably present in the range of about 0.1% to about 5%, by weight, of the braze gel 110. In some embodiments, the viscosity reducer is mixed with a braze paste of the braze powder and the braze binder to form the braze gel 110. In other embodiments, the braze powder, the braze binder, and the viscosity reducer may be combined and mixed in any order and in any number of steps or stages to achieve the braze gel 110.

A braze powder, as used herein, refers to any metal powder composition melting at a brazing temperature below a melting temperature of a base material to which the braze is applied.

A braze binder, as used herein, refers to any composition that serves as a carrier for mixing with a braze powder to make a braze paste.

A viscosity reducer, as used herein, refers to any composition that, when mixed with a braze paste, including at least one braze powder and at least one braze binder, reduces the viscosity of the braze paste.

A braze gel, as used herein, refers to any composition including at least one braze powder, at least one braze binder, and at least one viscosity reducer. In some embodiments, the viscosity reducer is present in an amount sufficient to give the braze gel a gel viscosity sufficiently low to permit dip coating of a component with the braze gel to apply a coating of the braze gel to the component. In some embodiments, the viscosity reducer is present in an amount sufficient to give the braze gel a gel viscosity sufficiently low to permit spray coating of a component with the braze gel to apply a coating of the braze gel to the component. In some embodiments, the viscosity reducer is present in an amount sufficient to give the braze gel a gel viscosity sufficiently low to permit brush coating of a component with the braze gel to apply a coating of the braze gel to the component.

In some embodiments, the component 100 is a turbine component. In some embodiments, the turbine component is part of a labyrinth seal, a shroud seal, or a diaphragm seal.

The braze gel 110 may include about 40% to about 95% braze powder, up to about 59.9% braze binder, and about 0.1 to about 5% viscosity reducer, by weight; alternatively greater than about 60% to about 80% braze powder, about 15% to about 39.9% braze binder, and about 0.1% to about 5% viscosity reducer, by weight; alternatively about 70% to about 75% braze powder, about 20% to about 29.9% braze binder, and about 0.1% to about 5% viscosity reducer, by weight; alternatively the braze powder and the braze binder in a 3:1 ratio, by weight, alternatively about 75% braze powder, about 20.9% to about 25% braze binder, and about 0.1% to about 5% viscosity reducer, by weight; or any range or sub-range therebetween.

The braze gel 110 includes, by weight, about 0.1% to about 5% viscosity reducer, alternatively about 1% to about 4% viscosity reducer, alternatively about 2% to about 3% viscosity reducer, alternatively about 0.1% to about 1% viscosity reducer, alternatively about 4% to about 5% viscosity reducer, or any range or sub-range therebetween.

The composition of the braze powder may include, but is not limited to, aluminum, cobalt, a silver-based braze alloy, a gold-based braze alloy, a copper-based braze alloy, a nickel-based braze alloy, an aluminum-based braze alloy, a cobalt-based alloy, a nickel-based alloy, or a combination thereof.

In some embodiments, the binder includes an organic polymer. In some embodiments, the binder includes a waterborne acrylic resin-based binder. In some embodiments, the binder includes water, polyvinyl alcohol, isopropanol, 4-methyl-2-pentanone, or a combination thereof.

The viscosity reducer may include, but is not limited to, ammonium chloride (NH$_4$Cl), ammonium fluoride (NH$_4$F), ammonium bromide (NH$_4$Br), chromium (II) chloride (CrCl$_2$), chromium (III) chloride (CrCl$_3$), aluminum chloride (AlCl$_3$), or a combination thereof.

The component 100 may be made of any high-temperature metal, which may include, but is not limited to, a nickel-based alloy, a cobalt-based alloy, or combinations thereof. In some embodiments, the braze gel 110 is applied directly to the base metal material of the component 100. In other embodiments, an aluminide coating is applied to the base metal material before the braze gel 110 is applied to the component 100.

In some embodiments, the structural features 106 are metal foils. The structural features 106 may have a spacing dimension of less than about 5 mm, alternatively less than about 4 mm, alternatively less than about 3 mm, alternatively less than about 2 mm, or alternatively less than about 1 mm. The structural features 106 may have a depth of at least about 1 mm, alternatively at least about 1.5 mm, alternatively at least about 2 mm, alternatively at least about 3 mm, or alternatively at least about 5 mm. In some embodiments, the structural features 106 make up less than about 10%, alternatively less than about 8%, alternatively less than about 5%, alternatively less than about 3%, alternatively less than about 1%, or any range or sub-range thereof, of the cross sectional area of the component 100, with the remaining area being open or void space. In some embodiments, the metal foils have a honeycomb geometry.

In some embodiments, the braze gel 110 has substantially about the same braze powder content as in a conventional braze paste but with a much lower viscosity at ambient temperature than the conventional braze paste so that a component 100 having structural features 106 is easily dipped into the braze gel 110 in a container 120 to apply the braze gel 110 to the submerged surfaces of the component 100. In some embodiments, the component 100 is a honeycomb component. After dipping, the component 100 is removed from the container 120. The dipped portion of the component 100 is covered with a fairly thin, fairly uniform layer of the braze gel 110. The braze gel 110 is allowed to dry to a fairly thin, fairly uniform layer of a braze coating 130 on the component 100. The component is then brazed to a backing member 140. In some embodiments, the brazing is a furnace brazing. In some embodiments, the brazing is a vacuum brazing.

The braze gel 110 sticks well to the component 100 during application, preferably better than a conventional brazing paste. The braze coating 130 dried on the component 100 also sticks strongly to the surface of the component 100.

A brazing process includes applying a braze gel 110, including a braze powder, a braze binder, and a viscosity reducer, to a component 100. The brazing process further includes allowing the braze gel 110 to dry to a braze coating 130 on the surface of the component. In some embodiments, the brazing process also includes mixing the braze powder, the braze binder, and the viscosity reducer to form the braze gel 110. In some embodiments, the brazing process also includes tack welding the component 100 to a backing member 140 and brazing the component 100 to the backing member 140.

In some embodiments, a suitable braze temperature is at least about 815° C. (about 1500° F.), alternatively at least about 1090° C. (about 2000° F.), alternatively at least about 1150° C. (about 2100° F.), alternatively at least about 1175° C. (about 2150° F.), alternatively at least about 1190° C. (about 2175° F.), alternatively in the range of about 815° C. to about 1230° C. (about 1500° F. to about 2250° F.), alternatively in the range of about 815° C. to about 1090° C. (about 1500° F. to about 2000° F.), alternatively in the range of about 1090° C. to about 1370° C. (about 2000° F. to about 2500° F.), alternatively in the range of about 1150° C. to about 1290° C. (about 2100° F. to about 2350° F.), alternatively in the range of about 1175° C. to about 1230° C. (about 2150° F. to about 2250° F.), alternatively in the range of about 1190° C. to about 1230° C. (about 2175° F. to about 2250° F.), or any combination, sub-combination, range, or sub-range thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process comprising:
   applying a braze gel having a gel viscosity to a portion of a component comprising an end of the component, the braze gel comprising a braze powder, a braze binder, and a viscosity reducer; then
   drying the braze gel on the portion of the component to form a braze coating and a braze-coated component, the braze-coated component comprising the component and the braze coating;
   contacting the braze-coated component to a backing member; and
   heating the braze coating to a brazing temperature to braze the end of the braze-coated component to the backing member;
   wherein the gel viscosity is lower than a paste viscosity of a braze paste comprising the braze powder and the braze binder with no viscosity reducer, the gel viscosity permitting dip coating of the component with the braze gel.

2. The process of claim 1 further comprising combining the braze powder, the braze binder, and the viscosity reducer to form the braze gel.

3. The process of claim 1, wherein the brazing temperature is in the range of about 815° C. to about 1230° C. (about 1500° F. to about 2250° F.).

4. The process of claim 1, wherein the applying comprises dip coating the braze gel on the portion of the component.

5. The process of claim 1, wherein the applying comprises spray coating the braze gel on the portion of the component.

6. The process of claim 1, wherein the component comprises a plurality of honeycomb cells.

7. The process of claim 1, wherein the viscosity reducer is selected from the group consisting of ammonium fluoride, ammonium bromide, chromium (II) chloride, chromium (III) chloride, aluminum chloride, and a combination thereof.

8. The process of claim 1, wherein the viscosity reducer is about 0.1% to about 5% of the braze gel, by weight.

9. The process of claim 8, wherein the braze powder is about 40% to about 95% and the braze binder is up to about 59.9% of the braze gel, by weight.

10. The process of claim 8, wherein the braze powder is greater than about 60% to about 80% and the braze binder is about 15% to about 39.9% of the braze gel, by weight.

11. The process of claim 8, wherein the braze powder is about 70% to about 75% and the braze binder is about 20% to about 29.9% of the braze gel, by weight.

12. The process of claim 1, wherein the component comprises structural features having a spacing of less than about 5 mm and a depth of at least about 1 mm, and the viscosity reducer reduces the gel viscosity of the braze gel such that the braze coating does not span the spacing between the structural features.

13. The process of claim 1, wherein the component forms at least a portion of a turbine component selected from the group consisting of a labyrinth seal, a shroud seal, and a diaphragm seal.

14. The process of claim 1, wherein the heating is furnace brazing.

15. The process of claim 1, wherein the heating is vacuum brazing.

16. The process of claim 1 further comprising removing a portion of the braze coating on the end of the component such that the end of the component contacts the backing member prior to the heating.

17. The process of claim 1 further comprising tack welding the component to the backing member prior to the heating.

18. The process of claim 1, wherein the braze coating has a thickness selected to provide no more than a predetermined excess amount of braze gel than needed to braze the component to the backing member.

19. The process of claim 1, wherein the braze binder is selected from the group consisting of an organic polymer, a waterborne acrylic resin-based binder, water, polyvinyl alcohol, isopropanol, 4-methyl-2-pentanone, and a combination thereof.

20. A process comprising:
applying a braze gel having a gel viscosity to a portion of a component comprising an end of the component, wherein the end of the component comprises structural features having a spacing of less than about 5 mm and a depth of at least about 1 mm, the braze gel comprising a braze powder, a braze binder, and a viscosity reducer;
drying the braze gel on the portion of the component to form a braze coating and a braze-coated component, the braze-coated component comprising the component and the braze coating;
contacting the braze-coated component to a backing member; and
heating the braze coating to a brazing temperature to braze the end of the braze-coated component to the backing member;
wherein the gel viscosity is lower than a paste viscosity of a braze paste comprising the braze powder and the braze binder with no viscosity reducer, the viscosity reducer reducing the gel viscosity of the braze gel such that the braze coating does not span the spacing between the structural features.

* * * * *